United States Patent Office 3,227,770
Patented Jan. 4, 1966

3,227,770
PRODUCTION OF QUATERNARY CARBON-CONTAINING MONOOLEFINS BY THERMAL DEHYDROHALOGENATION
Emmett H. Burk, Jr., Hazel Crest, and William D. Hoffman, Park Forest, Ill., assignors to Sinclair Research, Inc., Wilmington, Del., a corporation of Delaware
No Drawing. Filed Dec. 26, 1962, Ser. No. 247,345
7 Claims. (Cl. 260—677)

This application is a continuation-in-part of parent application Serial No. 94,956, filed January 11, 1961, now abandoned.

This invention relates to a process for the production of quaternary carbon-containing monoolefins.

The quaternary carbon-containing monoolefins have recently been found to be valuable alpha olefins for the production of polymers of high melting point and polymers possessing other highly desirable characteristics. For example, it has been reported in Linear and Stereoregular Addition Polymers, Gaylord and Mark, Interscience Publishers Inc., New York, 1959, page 64 that isotactic poly-3,3-dimethyl-1-butene has been produced having a melting point of approximately 300° C. Also a copolymer of ethylene and 3,3-dimethyl butene-1 has been made using a conventional peroxide catalyzed polymerization process which copolymer is characterized by being more flexible and having an increase in extensibility of 300 to 500 percent over low density polyethylene. (See U.S. Patent No. 2,728,752 to H. C. Brown.)

At the present time we have no knowledge of a commercially practical process for the manufacture of quaternary carbon-containing monoolefins such as 3,3-dimethyl butene-1. One of the reasons for this problem is the extremely unfavorable equilibrium of these monoolefins in isomeric mixture. In the case of 3,3-dimethyl butene-1, for instance, at temperatures of above 127° C. it is the least favored of the $C_6$ olefin isomers. For example, dehydration of pinacolone alcohol leads to only a 3% yield of 3,3-dimethyl butene-1 which is its equilibrium value in a mixture of dimethylbutenes.

Conventionally, 3,3-dimethyl butene-1 is prepared by a long and involved process which comprises dimerization of acetone by aluminum amalgam to form pinacol, re-arranging the pinacol to pinacolone by treatment with an acid catalyst, reducing the pinacolone by catalytic methods to the corresponding alcohol, i.e., 3,3-dimethyl-2-butanol, forming a xanthate or other appropriate ester of the alcohol and subjecting it to thermal pyrolysis to obtain 3,3-dimethyl butene-1. 3,3-Dimethylbutene-1 has been obtained by the pyrolysis of the stearic acid ester of 3,3-dimethyl butanol-2 (see Koch and Van Raay, Brennstoff—Chemie, 32, 161–174, 1951). This process, however, causes skeletal re-arrangement to produce in addition, the undesired isomer of the olefin, e.g., 2,3-dimethyl-1-butene and 2,3-dimethyl-2-butene. The isomer production and the involved procedure of the process thus makes it an obviously unpractical method for the commercial production of 3,3-dimethylbutene-1.

Dehydrohalogenation of halogen-hydrocarbons to produce olefins is not new. The production of monoolefins from monohalogenated normal paraffins presents no significant problem. In contrast, however, considerable difficulty is experienced in the dehydrohalogenation of halogen-substituted branched chain paraffins, particularly the neo-carbon-containing halogenated hydrocarbons of the present invention. These latter structures on dehydrohalogenation have a strong tendency to undergo skeletal re-arrangement destroying in large part the neo-structure and producing substantial amounts of isomers. For example, Louis Schmerling, in U.S. Patent No. 2,404,927 reported the dehydrochlorination of 1-chloro-3,3-dimethyl-butane but the product was a mixture of olefins containing a new carbon structure, i.e., the methyl groups appeared in the 2,3 positions. The dehydrochlorination reaction of Schmerling was carried out in the presence of a catalyst under temperatures ranging from 200 to 450° C.

We have now found a simple process of producing high selective yields of quaternary carbon atom-containing monoolefins with essentially no skeletal isomerization to other olefins of similar carbon atom content. The process comprises dehydrohalogenating a select feed material under defined reaction conditions.

The halogen hydrocarbon feed of the present invention may be represented by the structural formula:

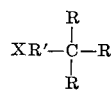

wherein R is an aliphatic monovalent hydrocarbon radical such as a lower alkyl, including cycloalkyl, of up to 8 carbons, the total carbon atoms in all R's being up to 18, preferably up to 12 and R may be branched or substituted with non-interfering groups; R' is a divalent aliphatic hydrocarbon radical of 2 to 8 carbons, preferably 2 to 4 carbon atoms; and X is a halogen atom having an atomic weight of 35 to 127. Preferably the halogen is substituted on a carbon atom beta to the neo-carbon atom. It is particularly preferred that the beta carbon atom be at an end of the carbon chain. Suitable feeds include, for instance, 1-chloro-3,3-dimethyl-butane; 1-chloro-3,3-dimethylpentane; 2-chloro-4,4-dimethylpentane, etc.

In accordance with the present invention the feed in vapor form is subjected to a temperature of about 400 to 600 or even 650° C., preferably 450 or 500 to 575° C. in a non-catalytic environment. Thus, the dehydrohalogenation can be satisfactorily effected in a non-packed or tubular reactor as long as the reactor's internal or contact surfaces are non-catalytic or the dehydrohalogenation may be conducted in such a reactor which contains non-catalytic, particulate contact material. The term "particulate" is meant to include, in addition to small individual forms such as beads, fragments, shavings, and like particles, other contact forms such as helices, wire meshes, etc. It is important that the contacting surfaces and contacting environment, since they are non-catalytic, be essentially free of acidic and basic materials, i.e., be essentially neutral and remain so during the reaction. Similarly, to insure a high selectivity in the dehydrogenation step, metals, metal oxides or other materials that may be present which react with hydrogen halide to give basic or acid environments should be held to a minimum. Thus the environment is such as to avoid the presence of materials that would cause a significant amount of hydrogen halide ionization. The surface therefore may be non-polar or non-ionic as such or may become so during the initial stages of reaction, which seems to be the case with the high nickel-containing metal surfaces.

Suitable contact surfaces whether they be walls of the reactor or contact materials in particulate form include for example, a quartz, Pyrex glass, ceramic, silica, coke, nickel and nickel alloys containing no more than about 40% iron, preferably less than about 20% or even less than about 10% iron. Included in the metal surfaces suitable for use in the present invention are those containing a high nickel content, usually at least about 40% by weight and no more than the defined amounts of iron. Preferably the nickel content is at least about 50% or even at least about 75%. Nickel alloys and other nickel-containing materials having iron or other metals that react with hydrogen halide present in amounts greater than about 40% have been found unsuitable for use in the present invention in that they effect substantial isomerization to isomers of the desired quaternary carbon-containing monoolefins and consequently give a relatively poor selectivity to the desired monoolefins for a given conversion. Metals other than iron that are generally present in nickel alloys in minor amounts do not seem to have a detrimental effect on the selectivity to the desired product of the present invention. Illustrative of a suitable nickel alloy is Hast-Alloy C which is employed in Examples V and XI below. Hast-Alloy C is composed of 50 to 60% Ni, 4.5 to 7% Fe, and minor amounts of Cr, W, Si, Mn, Cu, P and S. Another suitable nickel alloy is Monel metal which is commonly composed of about 68% Ni, 31% Cu and 1% Fe.

When particulate contact materials are employed an LHSV (liquid hourly space velocity) of about 0.5 to 20, preferably about 2 to 10 is generally employed. The reaction can be carried out at atmospheric, subatmospheric or superatmospheric pressure and pressures in the range of about 50 to 150 p.s.i.g. are preferred. If desired an inert gas such as nitrogen or carbon dioxide may be employed in the reaction and the inert gas can be in a ratio of about 0 or 1 to 20 or more moles to 1 mole of hydrogen chloride produced. Under the conditions of the present invention the selectivity to the corresponding quaternary carbon-containing monoolefin is greatly increased and no significant amounts of olefins of similar carbon content but without a neo-carbon, if any, are found in the crude product.

The feed of the present invention can be prepared by any method known to the art. 1-chloro-3,3-dimethylbutane, for example, can be prepared as described by Louis Schmerling in the Journal of the American Chemical Society, 67, 1152 (1945). Briefly the process involves reacting one mole of ethylene with t-butylchloride using a Friedel-Crafts catalyst such as $AlCl_3$, $FeCl_3$, $BiCl_3$, or $ZnCl_2$. The reaction can take place at atmospheric pressure when employing the reactive Friedel-Crafts catalysts such as $AlCl_3$, advantageously at a temperature of about −15° C. Under the conditions listed by Schmerling, i.e., complete conversion, the yield of 1-chloro-3,3-dimethylbutane was reported as 75% theory. Fractionation on a simple packed column generally furnishes a chloride of sufficient purity for use in the present invention.

The following examples are included to further illustrate the present invention.

EXAMPLE I

A Vycor reactor was packed with demagnetized tab alumina. This reactor was then heated to 480° C. with a stream of nitrogen passing through it. 1-chloro-3,3-dimethylbutane was introduced through a capillary from a calibrated reservoir. The reactor effluent was condensed on a Dry Ice cold-finger condenser. The hydrogen-chloride was swept out by the nitrogen into a sodium hydroxide trap. After a base wash, the reaction product was analyzed by gas chromatography to determine the relative amounts of the various olefin products. At a contact time of 2 seconds, a temperature of 480 to 500° C., the chloride was found to yield an olefin mixture containing 19% 3,3-dimethylbutene-1, 33% 2,3-dimethylbutene-1 and 48% 2,3-dimethylbutene-2. The yield of olefins was nearly quantitative.

In a second experiment at 530° C. and 1 second contact time, the ratio of 2,3-dimethyl-1-butene to 2,3-dimethyl-2-butene increased slightly. However, the yield of 3,3-dimethyl-butene-1 did not increase, illustrating the unsuitability of tab alumina as a contact material.

EXAMPLE II

A rock salt packing was substituted for the tab-alumina packing in the previous experiment. A contact time of about 2–3 seconds was used. 1-chloro-3,3-dimethylbutane was cracked at 4 different temperatures. At a temperature of 450° C., the olefin product consisted of the three dimethylbutene isomers in approximately the same yields as obtained over tab alumina. However, subsequent experiments at 530° C. and 590° C. produced olefins in high yields with no isomerization of the carbon chain. In these experiments, the only detectable $C_6$ olefin present was 3,3-dimethyl-1-butene. It is believed that at the lower temperature (450° C.) the reaction over rock salt is primarily catalytic, as opposed to thermal, and causes isomerization, while at the higher temperatures (530° C. and 590° C.) the reaction effected is essentially thermal, with little if any isomerization being obtained. At the high temperature, some carbon-carbon cleavage occurred to yield isobutylene and other low boiling compounds.

EXAMPLE III

A Vycor reactor was packed with Pyrex beads. The reactor was then heated to 570° C. in an electrical furnace. 1-chloro-3,3-dimethylbutane was introduced along with prepurified nitrogen as a diluent. The contact time was varied between 2 to 4 seconds. The experiments were carried out as before. Below is a summary of the results of these experiments.

Table 1

| Experiment | Feed [1] | Contact time | Temp. | Percent conversion | Percent 3,3-dimethyl-1-butene in olefin cut |
| --- | --- | --- | --- | --- | --- |
| 1 | 0 | 4 | 570 | 42 | 85 |
| 2 | 0 | 2 | 570 | 31 | 87 |
| 3 | 1 | 4 | 570 | 45 | 86 |
| 4 | 2 | 2 | 550 | [2] 20 | 78 |

[1] The same chloride was used in all experiments. The number listed in column refers to the number of times the feed in this experiment had been subjected to pyrolysis.
[2] Some of the olefin was lost during distillation. This yield has been corrected for that loss.

Following the last experiment, the recovered unreacted chloride was examined with the aid of infra-red and found to be identical to the starting chloride.

EXAMPLE IV

A Vycor reactor was packed with ceramic insulating beads and 1-chloro-3,3-dimethylbutane was dehydrochlorinated in accordance with the method of Example III. The reaction conditions and results are shown in Table II.

Table II

Reactor Volume—15.6 cc.
Reactor Packing—Ceramic Insulating Beads

| Run Number 1141- | 24 | 25 | 26 | 27 | 29 | 30 | 32 | 33 |
|---|---|---|---|---|---|---|---|---|
| Ave. temp., °F | 1,050.1 | 1,052.3 | 1,050.0 | 1,053.1 | 1,001.5 | 951.0 | 954.0 | 1,005.0 |
| Feed rate, cc./hr | 45.7 | 91.5 | 244.3 | 17.9 | 12.3 | 91.5 | 2.01 | 91.5 |
| Recovered $C_6Cl$ | 22.78 | 44.40 | 69.40 | 1.53 | 11.90 | 92.00 | 19.70 | 64.75 |
| Other | 77.22 | 55.60 | 30.60 | 98.47 | 88.10 | 8.00 | 80.30 | 35.25 |
| Total product: | | | | | | | | |
| Propylene | Trace | Trace | Trace | 2.99 | Trace | Trace | Trace | Trace |
| Isobutane | 3.64 | 2.69 | .735 | 2.17 | 6.50 | .238 | 9.20 | 1.57 |
| Isobutylene | | 7.00 | 2.83 | 20.23 | 9.32 | .246 | 9.50 | 3.25 |
| 3,3-DMButene-1 | 57.90 | 38.30 | 24.70 | 49.30 | 56.30 | 6.77 | 45.45 | 27.00 |
| $2Me2C_4=$ | Trace | 1.67 | Trace | 4.51 | 1.89 | Trace | 1.08 | .29 |
| Isoprene | 1.34 | .69 | .606 | 4.08 | 1.70 | Trace | .90 | .24 |
| 2,3-DMButene-1 | .83 | .21 | Trace | 2.79 | 1.67 | Trace | 2.22 | Trace |
| Unidentified | | | | 1.80 | 1.90 | .212 | 1.38 | |
| 2,3-DMButene-2 | Trace | .69 | Trace | .036 | 2.72 | .528 | 2.69 | .48 |
| t-Butyl chloride | 10.13 | | | | | | | |
| Vinyl chloride | 3.36 | 4.38 | 1.70 | 10.04 | 6.07 | Trace | 7.86 | 2.59 |
| Chloro-3,3-DMButane | 22.78 | 44.40 | 69.40 | 1.53 | 11.90 | 92.00 | 19.70 | 64.75 |
| Selectivity split, mols/100 moles feed: | | | | | | | | |
| Propylene | Trace | Trace | Trace | 3.39 | Trace | Trace | Trace | Trace |
| Isobutane | 4.92 | 5.26 | 2.53 | 2.46 | 7.93 | 2.98 | 12.72 | 4.78 |
| Isobutylene | | 13.78 | 9.79 | 22.90 | 11.38 | 3.08 | 13.14 | 9.90 |
| 3,3-DMButene-1 | 78.45 | 74.75 | 85.50 | 55.90 | 68.70 | 84.68 | 63.00 | 82.40 |
| $2 Me2C_4=$ | Trace | 3.27 | Trace | 5.11 | 2.31 | Trace | 1.50 | .88 |
| Isoprene | 1.81 | 1.35 | 2.16 | 4.62 | 2.07 | Trace | 1.24 | .73 |
| 2,3-DMButene-1 | 1.12 | .42 | Trace | 3.17 | 2.04 | Trace | 3.07 | Trace |
| Unidentified | | | | .85 | 2.32 | 2.65 | 1.91 | |
| 2,3-DMButene-2 | Trace | 1.35 | Trace | 1.22 | 3.31 | 6.61 | 3.73 | 1.46 |
| t-Butyl chloride | 13.70 | | | | | | | |
| Conversion | 77.22 | 55.60 | 30.60 | 98.47 | 88.10 | 8.00 | 80.30 | 35.25 |
| Selectivity | 78.45 | 74.75 | 85.50 | 55.90 | 68.70 | 84.68 | 63.00 | 52.40 |

The data of Examples III and IV clearly illustrate that the present invention is capable of producing high selectivity yields of 3,3-dimethyl butene-1 with little if any other $C_6$ olefins such as 2,3-dimethyl butene-1 and 2,3-dimethyl butene-2.

EXAMPLE V

In a large 3,3-dimethyl-1-butene preparation, 180 lbs. of 1-chloro-3,3-dimethylbutane was passed through a Hast-Alloy 1 inch universal reactor packed with ceramic beads, at a temperature of 1030° F. and an LHSV of 10. The product was washed with water and dilute sodium hydroxide. Analysis of the crude product indicated that the product contained 40% olefin.

After the olefin fraction of the product had been removed by distillation, the unconverted chloride was returned to the cracking reactor. Approximately 85 lbs. of crude olefin was recovered. Fractionation of the olefin product over maleic anhydride yielded 56 lbs. of material boiling at a plateau temperature of 105° F. An infrared analysis indicated that the purity of the 3,3-dimethyl-1-butene was greater than 98%. This represents a 66 mole percent yield.

EXAMPLE VI

A total of 3350 g. of 1-chloro-3,3-dimethylpentane was passed through a small quartz reactor filled with ceramic beads. The reaction conditions were: temperature 1050–1065° F.; LHSV 16. The effluent from the reactor was stabilized on a small packed column to recover the hydrogen chloride. The olefin was then removed by distillation. The unconverted chloride was returned to the reactor. After several passes, all but 1150 g. of the chloride had been converted and a yield of 1220 g. of crude olefin of approximately 85% purity was obtained. After final purification, which involved fractionation over maleic anhydride, treatment with dilute alkali and a final sodium treatment, a yield of 900 g. of 3,3-dimethyl-1-pentene of 97% purity was obtained.

EXAMPLE VII

In an experiment in which 1-chloro-3,3-dimethylbutane was passed over stainless steel helices (type 1808) in a quartz reactor, almost total conversion of the chloride to olefin occurred. The temperature range was from 900° F. to 1000° F. and the LHSV was 1. Analysis of the product by gas chromatography revealed that the major products were 2,3-dimethyl-1-butene and 2,3-dimethyl-2-butene. The high conversion plus the extent of the isomerization of the product indicated that the iron (probably as ferrous chloride) had an adverse catalytic effect on the reaction so far as production of 3,3-dimethyl-1-butene was concerned.

A second experiment was made in which nickel shavings were used in place of iron. The product was essentially 3,3-dimethyl-1-butene with only trace amounts of other $C_6$ olefins. The $C_6$ fraction was at least about 95%, 3,3-dimethyl-1-butene.

EXAMPLE VIII

A sample of 2-chloro-4,4-dimethylpentane, which had been prepared by alkylation of t-butylchloride with propylene, was pyrolyzed in a glass reactor at a temperature of 850° F. The conversion was 95% under these conditions and the selectivity nearly quantitative. Analysis of the olefin product indicated the following mixture of olefins: cis 4,4-dimethyl-2-pentene, 3.7% trans, -4,4-dimethyl-2-pentene, 73.2% and 23.1% 4,4-dimethyl-1-pentene.

EXAMPLE IX

A glass reactor was packed with 20 grams of stainless steel No. 310 shavings and 1-chloro-3,3-dimethylbutane was dehydrochlorinated by passing it through the reactor at a temperature of 1050° F., a liquid hourly space velocity (LHSV) of 4.4, and a pressure of 1 atmosphere. Stainless steel No. 310 consists of 22% chromium, 22% nickel, 53% iron, 2% manganese and 1% silicon. The results are shown in the following Table III.

Table III

| Component | Grams | Ultimate wt. percent yield [1] |
|---|---|---|
| $H_2-C_3$ | 4.90 | 4.69 |
| Isobutane | 1.51 | 1.44 |
| Vinyl chloride | 1.51 | 1.44 |
| Isobutylene | 4.74 | 4.53 |
| Neohexene (3,3-dimethyl-1-butene) | 36.90 | 35.50 |
| 2-methylbutene-2 | 1.46 | 1.40 |
| Isoprene | 1.58 | 1.51 |
| 2,3-dimethylbutene-2 | 9.17 | 7.54 |
| Hydrogen chloride | 33.80 | 31.25 |
| Neohexyl chloride (unconverted) | 54.50 | |
| 2,3-dimethylbutene-1 | 13.09 | 10.73 |
| Total | 163.16 | 100.03 |

[1] After corrections for 2.32% 2,3-dimethyl-1-chlorobutane and 0.45% 2,3-dimethylbutene in feed.
Conversion of neohexyl chloride=65.6.
Molar selectivity to neohexene=50.8.

The data of Table III demonstrate the substantial isomerization to 2,3-dimethylbutenes that occurs when employing contact materials having a high content of iron.

EXAMPLE X

A one inch diameter glass reactor packed with 20 grams of Hast-Alloy F shavings was used to dehydrochlorinate 1-chloro-3,3-dimethylbutane at a temperature of 1050° F. and atmospheric pressure. Hast-Alloy F contained 47% Ni, 17% iron and 22% Cr. Analysis of the resulting product showed a conversion of 48.4% and a selectivity to 3,3-dimethylbutylene-1 of 70.7. The ultimate yield of the 2,3-dimethylbutene isomer was less than 1% by weight.

EXAMPLE XI

Example X was repeated employing Hast-Alloy C shavings and temperatures of 1047° F. and 1000° F., respectively. Hast-Alloy C is a nickel alloy containing 4.5 to 7% iron. The results of the runs were as follows:

| Run | I | II |
|---|---|---|
| Temperature, °F | 1,047 | 1,000 |
| Conversion | 76.4 | 67.7 |
| Selectivity [1] | 67.0 | 73.7 |

[1] To 3,3-dimethylbutene-1.

The ultimate yield of the 2,3-dimethylbutene isomers was only about 3% by weight.

EXAMPLE XII

A glass reactor (114 cc.) was packed with 59 grams of Monel metal shavings and 1-chloro-3,3-dimethylbutane was dehydrochlorinated by passing it through the reactor at a temperature of 1025° F., a liquid hourly space velocity (LHSV) of 3.6 and a pressure of 1 atmosphere. Monel metal is an alloy consisting of 68% nickel, 31% copper and 1% iron. The results are shown in Table IV below.

Table IV

| Component | Grams | Ultimate wt. percent yield [1] |
|---|---|---|
| H₁–C₃ | 2.20 | 2.12 |
| Isobutane | 1.31 | 1.26 |
| Vinyl chloride | 2.73 | 2.63 |
| Isobutylene | 3.80 | 3.67 |
| 3,3-dimethylbutene-1 | 57.56 | 55.60 |
| 2-methylbutene-2 | 1.62 | 1.56 |
| Isoprene | 0.81 | 0.78 |
| 2,3-dimethylbutene-1 | 4.43 | 1.73 |
| 2,3-dimethylbutene-2 | 3.38 | 0.59 |
| t-Butyl chloride | 0.51 | 0.49 |
| Hydrogen chloride | 32.50 | 29.60 |
| Neohexyl chloride (unconverted) | 151.60 | |
| Total | 262.45 | 100.03 |

[1] After correction for feed as in Table III.
Conversion of neohexyl chloride=40.5%.
Molar selectivity to neohexene=79.6%.

The results of Examples X, XI and XII demonstrate the high selectivity towards the neo-structured olefins for a given conversion and the low isomerization to 2,3-dimethyl olefins obtained by alloys as contact materials in the process of the present invention. Such results contrast sharply with those afforded by use of the predominantly iron alloy of Example IX.

EXAMPLE XIII

1 - chloro-3,3-dimethylbutane was dehydrochlorinated by passing it through an Inconel coil reactor at atmospheric and superatmospheric pressures. Inconel is an alloy of 80% Ni, 14% Cr and 6% Fe. The conditions employed and results are shown in Table V below.

Table V

| Run | I | II | III | IV |
|---|---|---|---|---|
| Temp., °F | 919 | 900 | 945 | 948 |
| Pressure, p.s.i.g | 15.7 | 218.7 | 117.2 | 67.2 |
| LHSV | 0.67 | 7.96 | 1.30 | 3.06 |
| Conversion, percent | 39.6 | 21.4 | 79.3 | 44.1 |
| Molar selectivity [1] | 78.2 | 74.4 | 55.2 | 70.5 |
| Products, ultimate wt. Percent: | | | | |
| H₁–C₃ | 1.85 | 1.73 | 4.19 | 2.92 |
| C₄'s | 6.35 | 7.03 | 10.95 | 10.92 |
| C₅'s | 1.54 | 0.48 | 1.23 | 1.28 |
| 3,3-dimethylbutene-1 | 54.63 | 51.98 | 38.70 | 49.08 |
| 4-methylpentene-1 | 0.50 | 1.08 | 5.63 | 1.64 |
| 2,3-dimethylbutene-1 | 1.81 | 2.10 | 0.88 | 1.22 |
| 2-methylpentene-1 | 0.23 | 0.18 | 0.30 | 0.12 |
| 2,3-dimethylbutene-2 | 0.98 | 2.50 | 0.65 | 0.63 |
| Hydrogen chloride | 31.69 | 32.41 | 32.21 | 31.92 |
| Higher boiling products | | | 4.40 | |

[1] To 3,3-dimethylbutene-1.

The data of Table V demonstrate that use of superatmospheric pressures has only a small adverse effect on the yield of 3,3-dimethylbutene-1. The small decrease in neohexene yield may be found as an increase in 4-methylpentene-1 (a valuable olefin monomer), vinyl chloride and isobutane.

It is claimed:
1. A process for the production of quaternary carbon-containing monoolefins which comprises thermally dehydrohalogenating in the vapor form at a temperature of about 400 to 650° C. a halogenated hydrocarbon having the structural formula:

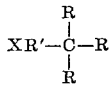

wherein R is an aliphatic monovalent hydrocarbon radical of up to 8 carbon atoms, the total carbon atoms being up to 18; R' is a divalent aliphatic hydrocarbon radical of 2 to 8 carbon atoms; and X is a halogen atom having an atomic weight of 35 to 127, said dehydrohalogenation being conducted in a non-catalytic environment with contact with a surface containing at least about 40% nickel and a maximum of about 40% iron.

2. The process of claim 1 in which the halogenated hydrocarbon is 1-halo-3,3-dialkyl hydrocarbon having a total of up to 12 carbon atoms.

3. The process of claim 2 in which the halogenated hydrocarbon is 1-chloro-3,3-dimethylbutane.

4. The process of claim 1 wherein the dehydrohalogenation is conducted in a non-catalytic environment and in the presence of a nickel alloy containing at least about 40% nickel and up to about 20% iron.

5. The process of claim 2 wherein the halo group is chloro.

6. The process of claim 1 wherein the halogen of the halogenated hydrocarbon is on a carbon atom beta to the neo-carbon atom and the halogenated hydrocarbon contains a total of up to 12 carbon atoms.

7. The process of claim 6 wherein the halogen of the halogenated hydrocarbon is chlorine.

References Cited by the Examiner

UNITED STATES PATENTS 2,314,335   3/1943   Frey _____ 260—677 X
2,379,372   6/1945   Mugdan et al. _____ 260—654

FOREIGN PATENTS 736,740   9/1955   Great Britain.

PAUL M. COUGHLAN, *Primary Examiner.*

ALPHONSO D. SULLIVAN *Examiner.*